United States Patent
Sakai

(10) Patent No.: US 10,286,861 B2
(45) Date of Patent: May 14, 2019

(54) CABLE REEL

(71) Applicant: HONDA MOTOR CO., LTD., Tokyo (JP)

(72) Inventor: Shinya Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/740,438

(22) PCT Filed: Jul. 1, 2016

(86) PCT No.: PCT/JP2016/069711
§ 371 (c)(1),
(2) Date: Dec. 28, 2017

(87) PCT Pub. No.: WO2017/002970
PCT Pub. Date: Jan. 5, 2017

(65) Prior Publication Data
US 2018/0194303 A1     Jul. 12, 2018

(30) Foreign Application Priority Data
Jul. 2, 2015  (JP) .................. 2015-133568

(51) Int. Cl.
*B60R 16/027*     (2006.01)
*H01R 35/04*      (2006.01)
*H01R 35/02*      (2006.01)

(52) U.S. Cl.
CPC ........... *B60R 16/027* (2013.01); *H01R 35/04* (2013.01); *H01R 35/025* (2013.01); *H01R 2201/26* (2013.01)

(58) Field of Classification Search
CPC .... B60R 16/027; H01R 35/04; H01R 35/025; H01R 201/26
(Continued)

(56) References Cited

U.S. PATENT DOCUMENTS 4,919,620 A * 4/1990 Yamaguchi ........... B60R 16/027
                                                            439/15
5,257,943 A * 11/1993 Ueno .................... H01R 35/025
                                                            439/15
(Continued)

FOREIGN PATENT DOCUMENTS

CN     101673900 A     3/2010
JP     H02-3688 U     1/1990
(Continued)

OTHER PUBLICATIONS

International Search Report dated Aug. 30, 2016, Application No. PCT/JP2016/069711 (2 pages).
(Continued)

*Primary Examiner* — Alexander Gilman
(74) *Attorney, Agent, or Firm* — Rankin, Hill & Clark LLP

(57) ABSTRACT

The present invention improves work efficiency at the time of attaching a cable reel to a vehicle steering device and the like. For this purpose, a cable reel is provided with: a stator member; a rotor member rotatably connected to the stator member; a flexible cable that provides an electrical connection between the stator member and the rotor member; and a locking member that prevents the rotor member from rotating relative to the stator member, wherein the locking member is arranged between the stator member and the rotor member.

12 Claims, 4 Drawing Sheets

(58) Field of Classification Search
USPC .......................................................... 439/15
See application file for complete search history.

(56) References Cited

U.S. PATENT DOCUMENTS

| | | | | | |
|---|---|---|---|---|---|
| 5,593,310 | A * | 1/1997 | Kawamoto | ........... | B60R 16/027 439/15 |
| 5,674,081 | A * | 10/1997 | Hoffmann | ............. | B60R 16/027 439/15 |
| 5,683,260 | A * | 11/1997 | Kato | ................... | B60R 16/027 439/15 |
| 5,741,145 | A * | 4/1998 | Kikkawa | ............... | B60R 16/027 439/15 |
| 5,800,191 | A * | 9/1998 | Honda | ................ | H01R 35/025 439/15 |
| 5,871,366 | A * | 2/1999 | Nishikigi | ............. | B60R 16/027 439/15 |
| 6,059,590 | A * | 5/2000 | Bolen | .................. | B60R 16/027 439/15 |
| 6,309,233 | B1 * | 10/2001 | Nakade | ................ | B60R 16/027 439/164 |
| 6,364,676 | B2 * | 4/2002 | Bunselmeier | ......... | B60R 16/027 439/164 |
| 6,368,127 | B1 * | 4/2002 | Araki | ................... | B60R 16/027 439/15 |
| 6,475,006 | B2 * | 11/2002 | Matsuzaki | ............ | B60R 16/027 439/164 |
| 6,488,225 | B2 * | 12/2002 | Maegawa | ............. | B60R 16/027 242/385.4 |
| 8,083,525 | B2 * | 12/2011 | Fiala | ..................... | B60R 16/027 439/15 |
| 9,627,832 | B2 * | 4/2017 | Wade | .................... | B60R 16/027 |
| 2001/0003683 | A1 * | 6/2001 | Matsumoto | ........... | B60R 16/027 439/164 |

FOREIGN PATENT DOCUMENTS

| | | |
|---|---|---|
| JP | H08-031534 A | 2/1996 |
| JP | 2001-167858 A | 6/2001 |
| JP | 2006-082686 A | 3/2006 |
| JP | 2009/238588 A | 10/2009 |
| JP | 2010-129187 A | 6/2010 |

OTHER PUBLICATIONS

Written Opinion of the International Searching Authority dated Aug. 30, 2016, Application No. PCT/JP2016/069711 (3 pages).
Chinese Office Action with English translation dated Oct. 29, 2018, 10 pages.

* cited by examiner

CABLE REEL

TECHNICAL FIELD

The present invention relates to a cable reel preferable for use in a vehicle steering device or the like.

BACKGROUND ART

A steering wheel of a vehicle includes various electronic parts attached thereto. Signals and electric power are input and output between the electronic parts and control devices installed on a body of the vehicle. In a steering device, a cable reel is mounted to enable an electrical connection while allowing rotation of the steering wheel. The cable reel has a stator member fixed to a frame of the vehicle and a rotor member coupled to a steering shaft. The stator member and the rotor member have respective connectors. Those connectors are connected with a flexible cable, which is housed in the cable reel. The cable reel has a movable range of about a few revolutions for each of left and right rotations from a reference position, which movable range corresponds to the steering range of the steering device. Thus, before the steering device is coupled to the cable reel, it is desirable that the stator member and rotor member be fixed to each other. In view of this, the patent document 1 discloses an art in which a locking member is configured to fix the stator member and the rotor member and to be broken by an operator as needed.

PRIOR ART DOCUMENT

Patent Document

Patent document 1: Japanese Unexamined Patent Application Publication No. 2009-238588

SUMMARY OF INVENTION

Problem to be Solved by the Invention

According to the art disclosed in the patent document 1, it requires "an operator to break the locking member" and further "to discard the broken locking member", thus requires complicated operations and special care.

The present invention has been developed in light of the circumstances described above, and an object of the invention is to provide a cable reel which can improve the work efficiency.

Solution to Problem

To achieve the above described object, the present invention provides a cable reel including: a stator member; a rotor member rotatably connected to the stator member; a flexible cable that provides an electrical connection between the stator member and the rotor member; and a locking member that prevents the rotor member from rotating relative to the stator member. The locking member is arranged between the stator member and the rotor member.

Arranging the locking member between the stator member and the rotor member prevents the locking member from being obstructive while the cable reel is being attached to a vehicle or the like and eliminates labor of detaching the locking member from the cable reel.

Preferably, the locking member includes fragile portions that break when the rotor member is made to rotate in a rotational direction.

With this feature, the locking member is easily broken at the fragile portions.

Preferably, the locking member includes a plurality of engaging members disposed over the stator member and engaging with the stator member.

Still preferably, the engaging members are disposed over the stator member at equal intervals.

With these features, the plurality of engaging members serve to maintain positional relationship between the locking member and the stator member in a stable manner.

Preferably, the locking member includes a remaining parts that remain on the stator member after the fragile portions break and include the engaging members; the stator member has claw members that engage with the engaging members; and each of the claw members has an inclined portion with which corresponding one of the engaging members is in contact, wherein the inclined portion is inclined so that a force is applied to the remaining parts to separate the remaining parts from the rotor member.

With this structure, after the fragile portions break, the locking member may be reliably separated from the rotor member.

Preferably, the claw members, the engaging members, and the fragile portions are correspondingly aligned in a direction along a rotational axis of the rotor member before the fragile portions break.

With this structure, the locking member may be biased at portions thereof where the fragile portions existed, in a direction in which the locking member separates from the rotor member.

Effects of Invention

The cable reel of the present invention may improve work efficiency.

EMBODIMENTS FOR CARRYING OUT THE INVENTION

[Configuration of Embodiment]

Figure 1:
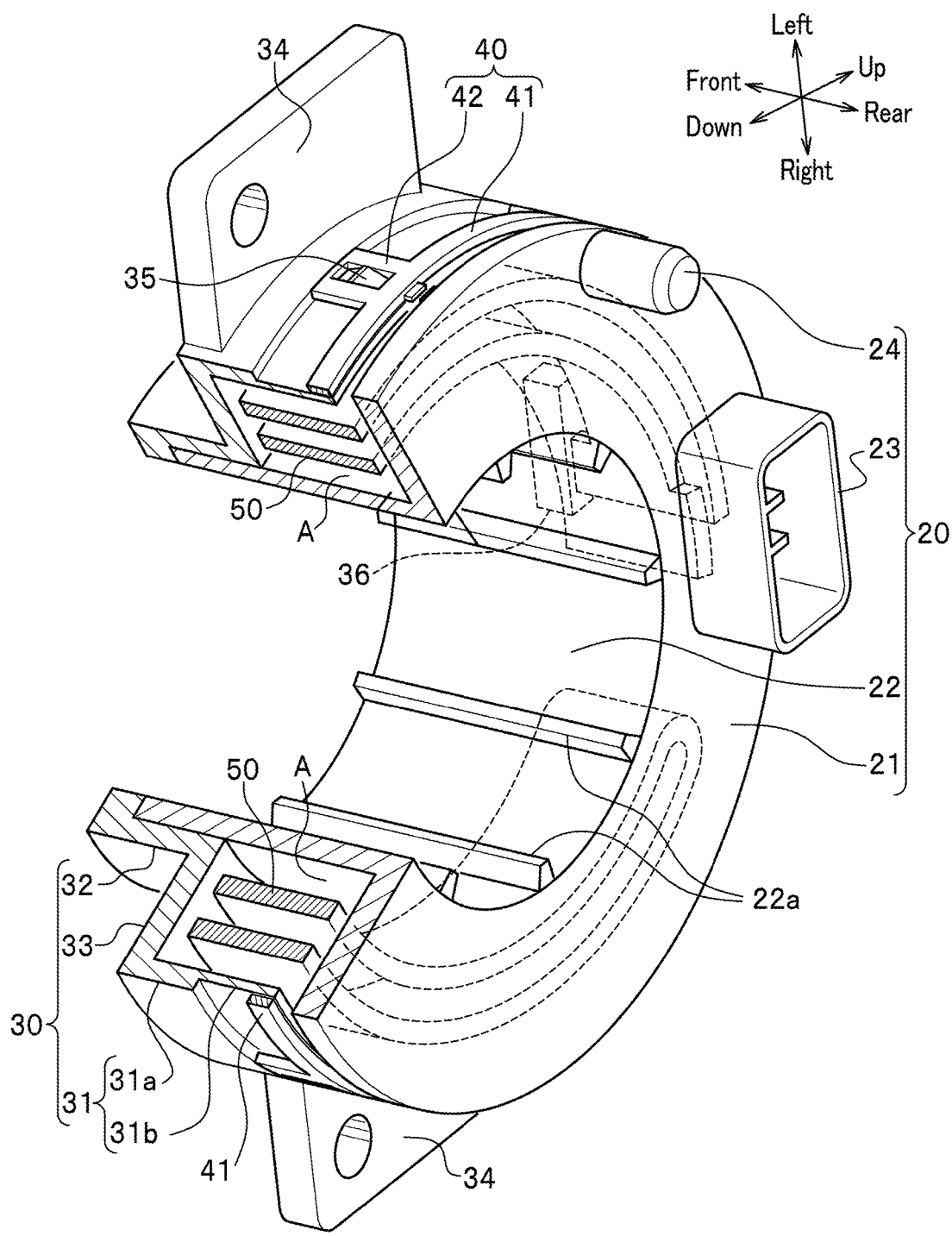
FIG. 1 is a partially cut-out perspective view of a cable reel of an embodiment of the present invention.

A description is given of the configuration of a cable reel according to an embodiment of the present invention with reference to the partially cut-out perspective view shown in FIG. 1.

In FIG. 1, the cable reel has a rotor member 20 and a stator member 30. Note that, FIG. 1 shows the cable reel in a state in which later-described fragile portions have been broken so that the rotor member 20 and the stator member 30 are rotatable relative to each other. The rotor member 20 has a circular annular portion 21 formed in a circular annular shape and a cylindrical portion 22 which extends forwardly from an inner periphery of the circular annular portion 21. As such, the rotor member 20 is formed so as to have a substantially L-shaped cross section when the rotor member 20 is cut in a radial direction. The cylindrical portion 22 has an inner circumferential surface on which a plurality of projections 22a each having a substantially trapezoidal cross section and extending along a front-rear direction are formed.

A steering shaft (not shown), which is a part of a steering device (not shown), is inserted through the cylindrical portion 22. The steering shaft has a plurality of grooves formed thereon that fit with the projections 22a. With this structure, the whole of the rotor member 20 rotates in conjunction with the steering shaft. The circular annular portion 21 has a connector 23 and a cylindrically-shaped positioning member 24 formed such that they project rearwardly. The positioning member 24 engages with a predetermined portion of the steering shaft to position the rotor member 20 and the steering shaft.

The stator member 30 has a circular annular portion 33 formed such as to surround the cylindrical portion 22 of the rotor member 20, and a small-diameter cylindrical portion 32 that extends forwardly from an inner periphery of the circular annular portion 33 and slides with the cylindrical portion 22 of the rotor member 20. The small-diameter cylindrical portion 32 has a front end portion that extends inwardly, thereby engagingly stopping the cylindrical portion 22 of the rotor member 20. The stator member 30 also has a large-diameter cylindrical portion 31 that extends rearwardly from an outer periphery of the circular annular portion 33. As such, the stator member 30 is formed so as to have a substantially crank-shaped cross section when the stator member 30 is cut in a radial direction. The rotor member 20 and the stator member 30 define a hollow space A therebetween having a substantially rectangular cross section.

The large-diameter cylindrical portion 31 of the stator member 30 has a thick portion 31a and a thin portion 31b respectively located in the front and the rear of the large-diameter cylindrical portion 31. The thick portion 31a has a pair of flanges 34 each having a rectangular shape and projecting in a right-left direction. The flanges 34 are fixed to a frame (not shown) of a vehicle with bolts or the like, whereby the whole of the stator member 30 is fixed to the frame. The thick portion 31a has a connector 36 formed thereon so as to project in an upper direction.

The connectors 23 and 36 are interconnected by a flat cable 50 having flexibility. The flat cable 50 extends forwardly from the connector 23, makes a right angle turn, further extends along an inner periphery of the hollow space A in a counterclockwise direction over a certain length, and then deforms to fold back in a semicircle shape. The flat cable 50 further extends along an outer periphery of the hollow space A in a clockwise direction over a certain length, makes a right angle turn, and then is connected to the connector 36. Note that the flat cable 50 shown in FIG. 1 is in a state where the rotor member 20 is at a reference position (center position in the steering range of the steering device). When the rotor member 20 rotates, the flat cable 50 deforms following the motion of the rotor member 20.

The thin portion 31b of the large-diameter cylindrical portion 31 has an outer circumferential surface on which substantially triangular plate-shaped claw members 35 are formed such as to project in a radial direction. In FIG. 1, only one of the claw members 35 is shown. The claw members 35 are formed at eight points equally dividing the circumference of the thin portion 31b. A stopper ring 40 serving as a locking member is arranged so as to surround the outer periphery of the thin portion 31b. The stopper ring 40 includes: a ring portion 41 formed in a ring shape having a predetermined width in a front-rear direction; and eight engaging members 42 each of which has a rectangular frame shape, projects forwardly from the ring portion 41, and engages with one of the claw members 35. Note that, in the present embodiment, the stopper ring 40 does not play a specific role after the cable reel is actually placed in service.

[Manufacturing/Assembling Procedure]

Figure 2A:
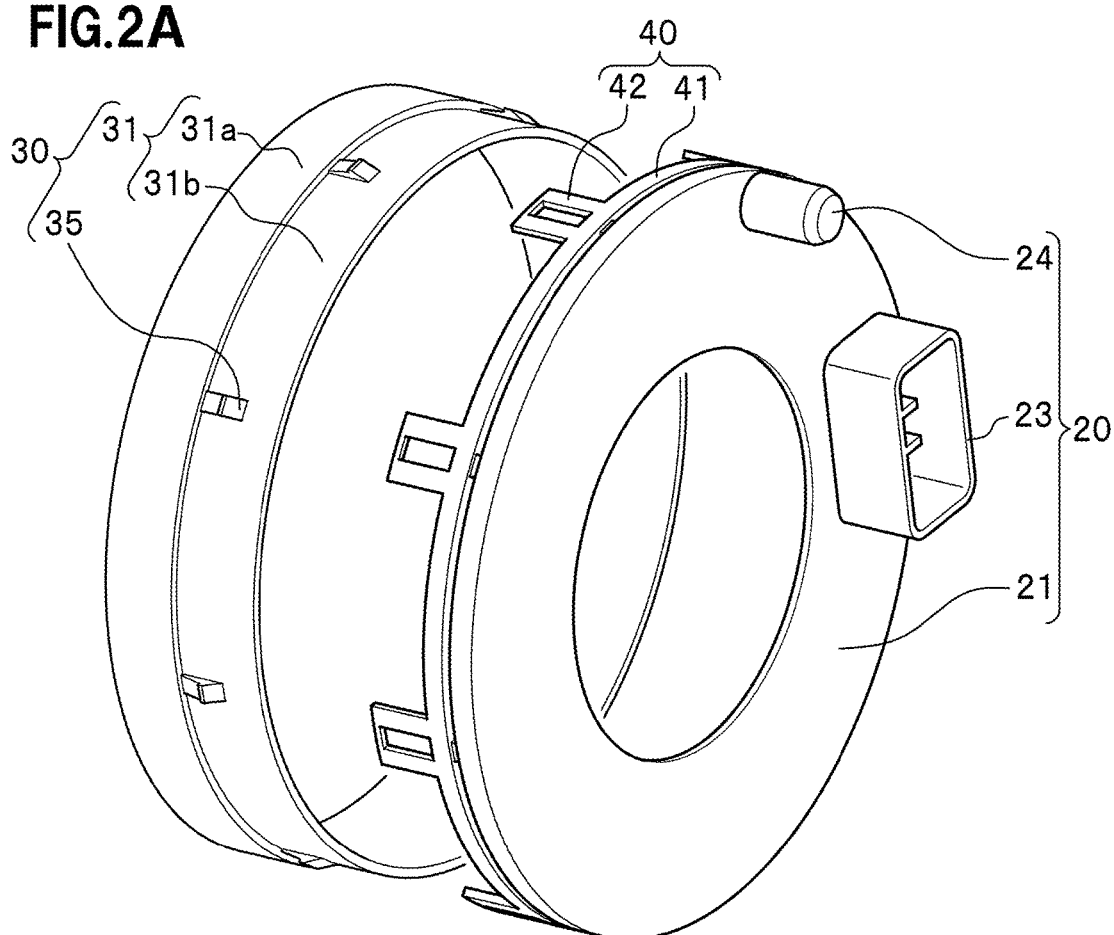
FIG. 2A is a perspective view showing main components of the cable reel before a stator member and a rotor member are coupled.

When manufacturing (assembling) the cable reel, first, the stator member 30 and the rotor member 20 are separately prepared and placed so as to face with each other as shown in the perspective view of FIG. 2A. Incidentally, in the subsequent figures, only parts relevant to the stopper ring 40 are mainly shown, and illustration of the cylindrical portion 22 of the rotor member 20, the flat cable 50 and the like shown in FIG. 1 is omitted. As shown in FIG. 2A, in a state where the stator member 30 and the rotor member 20 have not been coupled with each other, the stopper ring 40 is integral with the rotor member 20 via fragile portions 43 (see FIG. 2B).

Figure 2B:
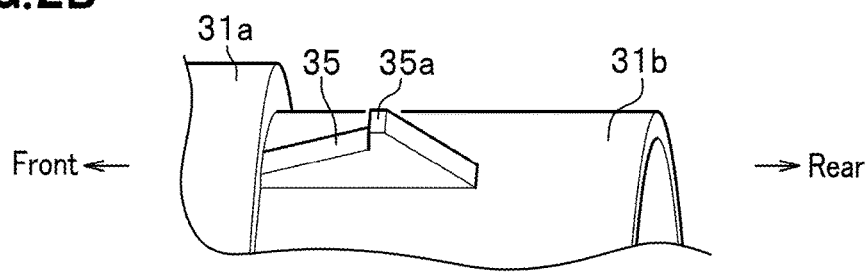
FIG. 2B is a perspective view of a claw member.
Figure 2C:
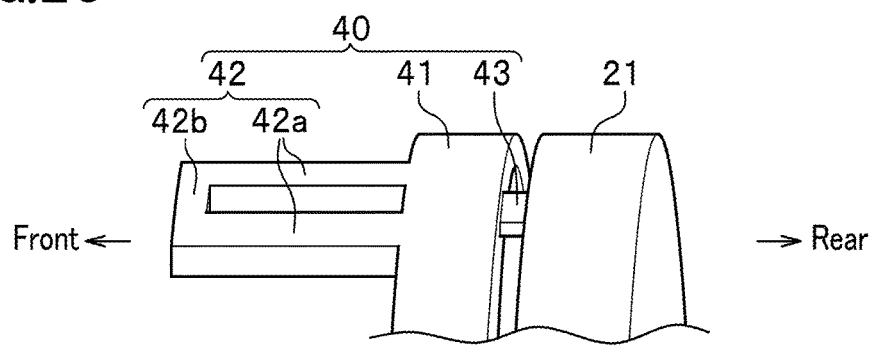
FIG. 2C is a perspective view of an engaging member.

The shape of one of the claw members 35 is shown in detail in the perspective view of FIG. 2B. Each of the claw members 35 is formed in a substantially triangular plate shape as described above, and has an apex portion whose front part is cut out along the radial direction of the thin portion 31b to form a stepped portion 35a. The shape of the stopper ring 40 in the vicinity of one of the engaging members 42 is shown in detail in the perspective view of FIG. 2C. As described above, each of the engaging members 42 has a rectangular frame shape and projects forwardly from the ring portion 41. In other words, each of the engaging members 42 has a pair of quadrilateral pole-shaped projection poles 42a and an engaging pole 42b uniting front ends of the projection poles 42a.

The ring portion 41 of the stopper ring 40 is connected with the circular annular portion 21 of the rotor member 20 via the fragile portions 43, each of which has a narrow quadrilateral pole-shape and is located rearwardly of corresponding one of the engaging members 42. The fragile portions 43 have a smaller strength than the ring portion 41, engaging members 42, and the circular annular portion 21, such that the fragile portions 43 break when a force is applied to the circular annular portion 21 and the engaging members 42 such as to rotate them relatively in a direction of revolution.

Figure 3A:
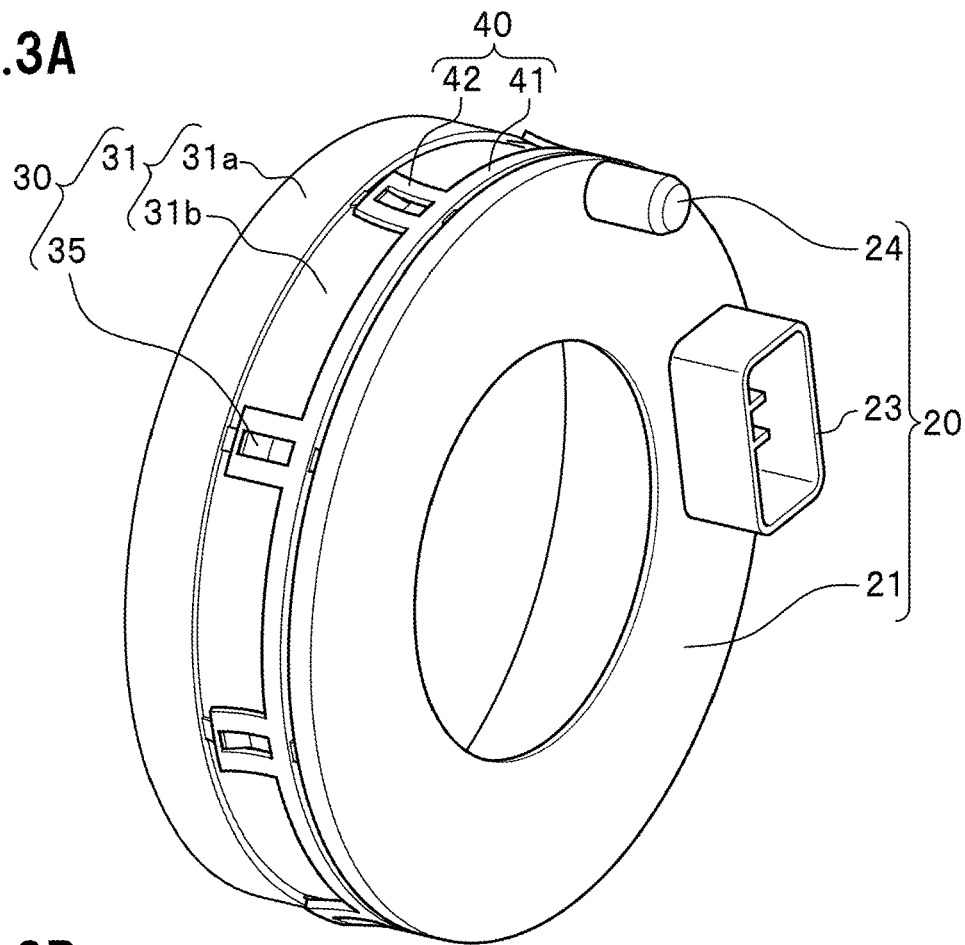
FIG. 3A is a perspective view showing the main components of the cable reel after the stator member and the rotor member are coupled with each other.

When the claw members 35 and the engaging members 42 are positioned so as to be opposed to each other as shown in FIG. 2A and then the rotor member 20 is fitted to the stator member 30, the rotor member 20 and the stator member 30 appear as shown in the perspective view of FIG. 3A. As shown in FIG. 3A, each of the engaging members 42 engages with one of the claw members 35 while deforming to curve outwardly in the radial direction. Accordingly, in this state, at eight points equally dividing the circumference of the large-diameter cylindrical portion 31, the engaging members 42, the fragile portions 43, and the claw members 35 are correspondingly aligned with each other in a direction along a rotational axis of the rotor member 20 (front-rear direction in the figure).

Figure 3B:
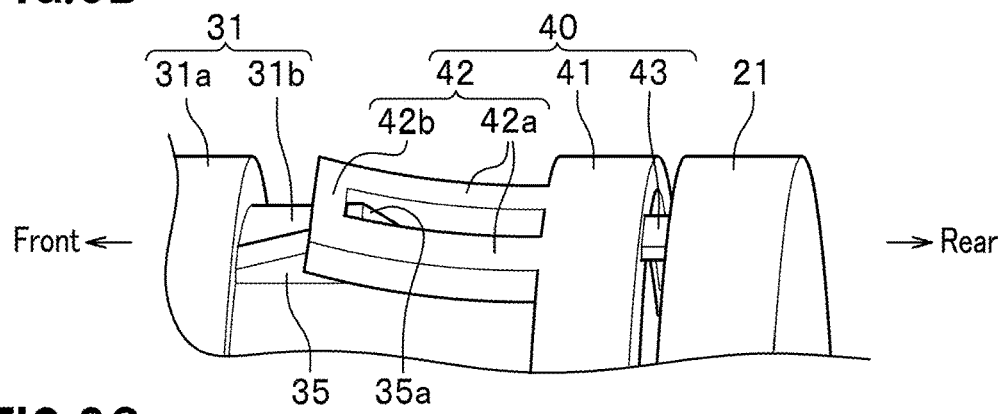
FIG. 3B is a perspective view of the claw member and the engaging member after the stator member and the rotor member are coupled with each other.

The vicinity of one of the engaging members 42 in this state is shown in detail in the perspective view of FIG. 3B. As shown in the figure, the engaging pole 42*b* of the engaging member 42 is located in front of the stepped portion 35*a* of the corresponding claw member 35. Even when a force is applied such that the stopper ring 40 may be pull out in a rearward direction, because the engaging pole 42*b* is engagingly stopped by the stepped portion 35*a*, the stopper ring 40 is not easily dislodged. In addition, as shown in FIG. 1, because the rotor member 20 is engagingly stopped by the small-diameter cylindrical portion 32 of the stator member 30, the stopper ring 40 does not move forwardly further than as shown in FIG. 1.

Figure 3C:
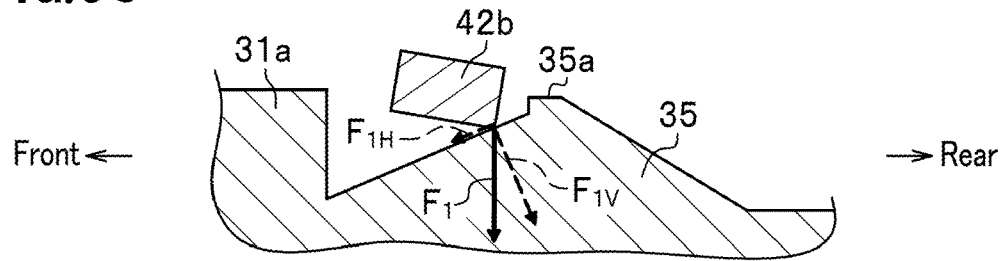
FIG. 3C is a cross-sectional view of the claw member and the engaging member after the stator member and the rotor member are coupled with each other.

FIG. 3C shows a cross-sectional view of the claw member 35 and the engaging pole 42*b* shown in FIG. 3B when they are cut in the radial direction of the stator member 30. The engaging member 42 deforms to curve outwardly in the radial direction, and a force F1 acts in the radial direction. Meanwhile, the claw member 35 has a section extending from the stepped portion 35*a* to the thin portion 31*b* and inclined such as to have a decreasing radius toward the front of the section. With this structure, the force F1 can be divided into a tangential component F1H acting on the engaging pole 42*b* in a direction along the inclined surface and a normal component F1V acting on the engaging pole 42*b* in a direction perpendicular to the tangential component F1H, at a point where the claw member 35 and the engaging pole 42*b* are in contact with each other. The tangential component F1H biases the engaging pole 42*b* in a direction along the surface of the claw member 35 (forward direction).

The cable reel is attached to a vehicle in the same state as shown in FIG. 3A. Specifically, the stator member 30 is attached to a frame of the vehicle and the rotor member 20 is attached to a steering device. In this operation, a steering shaft is inserted through the cylindrical portion 22. After the steering device is attached to the vehicle, when an operator rotates a steering wheel somewhat forcibly, a force is applied via the steering shaft to the rotor member 20 in a rotational direction to break the fragile portions 43, separating the rotor member 20 and the stopper ring 40 from each other. This releases a locked state of the rotor member 20 and the stator member 30. In FIGS. 3B and 3C, when the fragile portion 43 breaks, the tangential component F1H of the force F1 causes the engaging member 42 to move forward while sliding over the inclined surface of the claw member 35, until the engaging pole 42*b* abuts against the thick portion 31*a* of the large-diameter cylindrical portion 31.

Figure 4A:
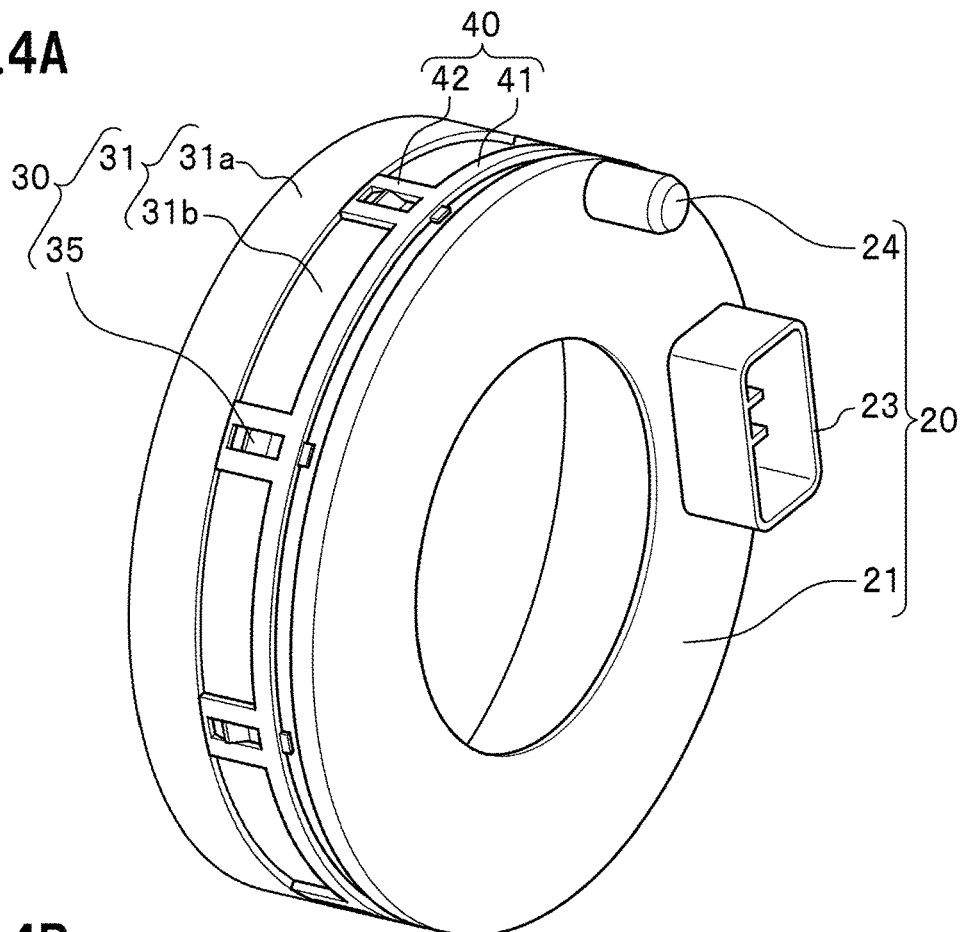
FIG. 4A is a perspective view of the cable reel in use.

In this state, the cable reel appears as shown in the perspective view of FIG. 4A. As described above, each of the engaging members 42 has moved to a location where the engaging member 42 abuts against the thick portion 31*a* of the large-diameter cylindrical portion 31. The vicinity of the engaging member 42 in this state is shown in detail in the perspective view of FIG. 4B. The fragile portion 43 shown in FIG. 3B has been broken into broken pieces 25 and 45 shown in FIG. 4B. FIG. 4C shows a cross-sectional view of the claw member 35 and the engaging pole 42*b* shown in FIG. 4B, when they are cut in a radial direction of the stator member 30.

The claw member 35 has a portion having an outer diameter slightly larger than an inner diameter of the engaging member 42. Accordingly, the engaging member 42 deforms to curve outwardly in the radial direction even in the state shown in FIG. 4C, and a force F2 acts in the radial direction. The force F2 can be divided into a tangential component F2H acting on the engaging pole 42*b* in a direction along the surface of the claw member 35 and a normal component F2V acting on the engaging pole 42*b* in a direction perpendicular to the tangential component F2H, at a point where the claw member 35 and the engaging pole 42*b* are in contact with each other. The tangential component F2H keeps biasing the engaging pole 42*b* forwardly such that the engaging pole 42*b* is kept abutting against the thick portion 31*a*.

Figure 4B:
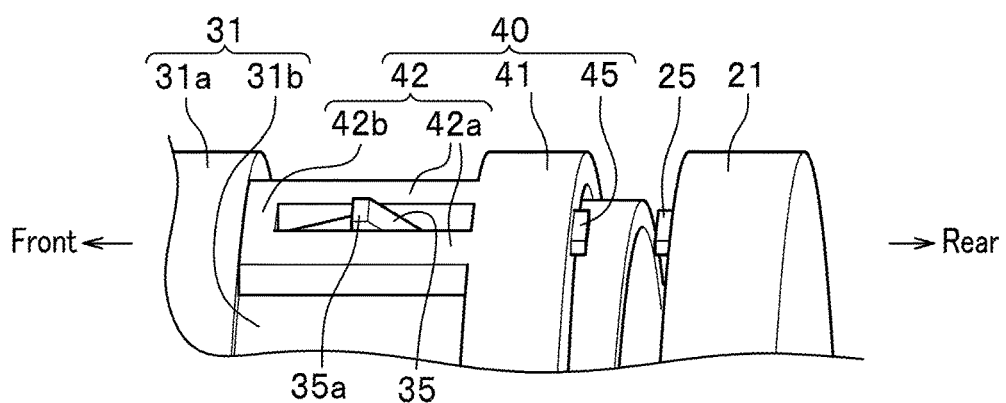
FIG. 4B is a perspective view of the claw member and the engaging member in use.
Figure 4C:
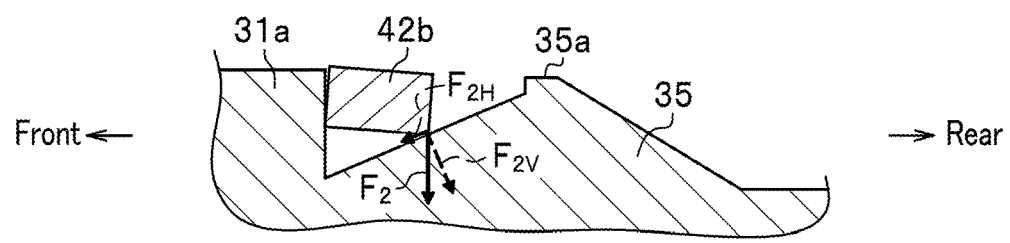
FIG. 4C is a cross-sectional view of the claw member and the engaging member in use.

If the broken pieces 25 and 45 shown in FIG. 4B come into contact with each other while the vehicle is traveling, an abnormal noise may occur or "a feel of resistance" may be felt in a steering operation of the steering wheel. However, in the present embodiment, because the engaging pole 42*b* is kept biased forwardly such that the engaging pole 42*b* is kept abutting against the thick portion 31*a* as described above, a sufficient clearance may be secured between the broken pieces 25 and 45 to inhibit them from coming into contact with each other.

While the vehicle is traveling, when the large-diameter cylindrical portion 31 and the stopper ring 40 move relative to each other due to vibration, they might possibly collide with each other to generate an abnormal noise. However, in the present embodiment, because the engaging pole 42*b* is kept biased forwardly such that the engaging pole 42*b* is kept abutting against the thick portion 31*a*, the positional relationship between the large-diameter cylindrical portion 31 and the stopper ring 40 may be maintained and the occurrence of an abnormal noise due to vibration may be inhibited.

[Effects of Embodiment]

As seen from the foregoing, according to the present embodiment, an operation of "rotating a steering wheel" may break the fragile portions 43 to release the locked state of the stator member 30 and the rotor member 20. Here, the operation of "rotating a steering wheel" is necessary to test a vehicle regardless of whether the locked state of the cable reel has been released, in order to confirm that the steering device functions normally. Accordingly, the present embodiment eliminates an operation necessary only for releasing the locked state and thus improves work efficiency.

In addition, according to the present embodiment, the stopper ring 40 arranged between the stator member 30 and the rotor member 20 prevents the stopper ring 40 from being obstructive while the cable reel is being attached to a vehicle, so that the cable reel with the stopper ring 40 attached thereto may be attached to the vehicle. This means that an operation for detaching the stopper ring 40 from the stator member 30 and an operation for discarding the stopper ring 40 are not necessary. Therefore, the work efficiency is further improved. In addition, after the stopper ring 40 is separated from the circular annular portion 21 of the rotor member 20, because the engaging pole 42*b* is kept biased forwardly such that the engaging pole 42*b* is kept abutting against the thick portion 31*a*, it is possible to prevent a feel of resistance from being felt and the occurrence of an abnormal noise in a traveling vehicle. Incidentally, according to the art disclosed in the aforementioned patent document 1, because the rotor may rotate relative to the stator after the locking member is detached, an operator needs to take care of such rotation in the assembling operation of the steering device. In contrast, the present embodiment does not necessitate such care.

In the present embodiment, before the fragile portions 43 break, the claw members 35, the engaging members 42, and the fragile portions 43 are correspondingly aligned with each other in a direction along a rotational axis of the rotor member 20 (front-rear direction) (see FIG. 3B). Therefore, after the fragile portions 43 break, each of the engaging members 42 engages with the corresponding claw member 35 in the vicinity of corresponding broken pieces 25 and 45 (see FIG. 4B). This reliably maintains the clearance between the broken pieces 25 and 45 even when flexion occurs in the ring portion 41 in the front-rear direction.

[Examples of Variants]

The present invention is not limited to the above-described embodiment and various modifications can be made thereto. The above-described embodiment is exemplified to facilitate the understanding of the present invention, and thus the invention is not necessarily limited to have all the features described. In addition, a part of the configuration of a certain embodiment may be replaced with the configuration of another embodiment, and the configuration of a certain embodiment may be modified by adding a configuration of another embodiment. Further, a part of the configuration in each of the embodiments may be modified by adding other configuration, by deletion, or by replacing with other configuration. Examples of possible variants of the above described embodiment include the following.

(1) In the embodiment described above, the large-diameter cylindrical portion 31 of the stator member 30 is not in contact with the circular annular portion 21 of the rotor member 20. However, they may be configured to be slidably in contact with each other.

(2) In the embodiment described above, the engaging members 42 and the fragile portions 43 are correspondingly aligned with each other in a direction along a rotational axis of the rotor member 20. However, their positional relationship may be modified as needed. In addition, the number of the engaging members 42 and the number of the fragile portions 43 (eight for each in the above-described embodiment) may be different from the ones of the above-described embodiment.

REFERENCE SIGNS LIST

20: rotor member
21: circular annular portion
23, 36: connector
25, 45: broken piece
30: stator member
31: large-diameter cylindrical portion
31*a*: thick portion
31*b*: thin portion
32: small-diameter cylindrical portion
33: circular annular portion
35: claw member
35*a*: stepped portion
40: stopper ring (locking member)
41: ring portion (remaining part)
42: engaging member (remaining part)
42*a*: projection pole
42*b*: engaging pole
43: fragile portion
50: flat cable (flexible cable)

The invention claimed is:

1. A cable reel comprising:
a stator member;
a rotor member rotatably connected to the stator member;
a flexible cable that provides an electrical connection between the stator member and the rotor member; and
a locking member formed integrally with the rotor member and comprising a plurality of fragile portions and a plurality of engaging members,
wherein each of the plurality of fragile portions is located between the rotor member and a corresponding one of the plurality of engaging members, and
wherein the plurality of engaging members engage with the stator member, wherein the locking member further comprises a ring portion disposed over the stator member; and wherein the plurality of engaging members are joined to the ring portion.

2. The cable reel of claim 1, wherein the plurality of fragile portions of the locking member break to separate the locking member from the rotor member when the rotor member is made to rotate relative to the stator member.

3. The cable reel of claim 2, wherein the plurality of engaging members are disposed over the stator member at equal intervals.

4. The cable reel of claim 3 wherein:
the ring portion and the plurality of engaging members are remaining parts that remain on the stator member after the fragile portions break;
the stator member has claw members that engage with the plurality of engaging members; and
each of the claw members has an inclined portion with which a corresponding one of the plurality of engaging members is in contact, wherein the inclined portion is inclined so that a force is applied to the remaining parts to separate the remaining parts from the rotor member.

5. The cable reel of claim 4, wherein the claw members, the plurality of engaging members, and the plurality of the fragile portions are correspondingly aligned in a direction along a rotational axis of the rotor member before the plurality of fragile portions break.

6. The cable reel of claim 1,
wherein the locking member further comprises a ring portion disposed over the stator member;
wherein the plurality of engaging members are joined to the ring portion.

7. The cable reel of claim 6, wherein the plurality of engaging members are disposed over the stator member at equal intervals.

8. The cable reel of claim 7, wherein:
the ring portion and the plurality of engaging members are remaining parts that remain on the stator member after the plurality of fragile portions break;
the stator member has claw members that engage with the plurality of engaging members; and
each of the claw members has an inclined portion with which a corresponding one of the plurality of engaging members is in contact, wherein the inclined portion is inclined so that a force is applied to the remaining parts to separate the remaining parts from the rotor member.

9. The cable reel of claim 8, wherein the claw members, the plurality of engaging members, and the plurality of fragile portions are correspondingly aligned in a direction along a rotational axis of the rotor member before the plurality of fragile portions break.

10. A cable reel comprising:
a stator member;
a rotor member rotatably connected to the stator member;
a flexible cable that provides an electrical connection between the stator member and the rotor member; and
a locking member that is arranged between the stator member and the rotor member to prevent the rotor member from rotating relative to the stator member,
wherein the locking member comprises:
- a plurality of fragile portions;
- a ring portion disposed over the stator member; and
- a plurality of engaging members joined to the ring portion, engaging with the stator member, and disposed over the stator member at equal intervals.

11. The cable reel of claim 10, wherein:
the ring portion and the plurality of engaging members are remaining parts that remain on the stator member after the plurality of fragile portions break;
the stator member has claw members that engage with the plurality of engaging members; and
each of the claw members has an inclined portion with which a corresponding one of the plurality of engaging members is in contact, wherein the inclined portion is inclined so that a force is applied to the remaining parts to separate the remaining parts from the rotor member.

12. The cable reel of claim 11, wherein the claw members, the plurality of engaging members, and the plurality of fragile portions are correspondingly aligned in a direction along a rotational axis of the rotor member before the plurality of fragile portions break.

* * * * *